United States Patent [19]

Minematsu et al.

[11] 4,273,895

[45] Jun. 16, 1981

[54] PROCESS FOR PREPARING THERMOPLASTIC RESIN

[75] Inventors: Hiroyuki Minematsu, Niihama; Kojiro Matsumoto, Takarazuka; Tadashi Saeki; Akira Kishi, both of Niihama, all of Japan

[73] Assignee: Sumitomo Naugatuck Co., Ltd., Japan

[21] Appl. No.: 54,507

[22] Filed: Jul. 3, 1979

[30] Foreign Application Priority Data

Jul. 4, 1978 [JP] Japan ................................ 53-81753

[51] Int. Cl.$^3$ ............................................ C08F 279/02
[52] U.S. Cl. ...................................... 525/264; 525/316
[58] Field of Search ................................ 525/316, 264

[56] References Cited

U.S. PATENT DOCUMENTS

| | | | |
|---|---|---|---|
| 3,336,417 | 8/1967 | Sakuma | 525/316 X |
| 3,980,600 | 9/1976 | Coffey | 525/316 X |
| 3,991,136 | 9/1976 | Dalton | 525/316 X |
| 4,009,227 | 2/1977 | Ott | 525/316 X |

*Primary Examiner*—C. A. Henderson
*Attorney, Agent, or Firm*—Jones, Tullar & Cooper

[57] ABSTRACT

A process for preparing a thermoplastic resin having excellent heat resistance, impact resistance and processability, which comprises emulsion polymerization of a mixture comprising a monomeric mixture consisting essentially of an α-alkylstyrene, methyl methacrylate and an unsaturated nitrile and a diene rubber latex containing particles of 400 to 900 Å in particle size in an amount of not less than 30% by weight in the presence of a radical initiator, the weight proportion of the monomeric mixture and the diene rubber latex (solids) being from 60:40 to 95:5.

6 Claims, No Drawings

PROCESS FOR PREPARING THERMOPLASTIC RESIN

The present invention relates to a process for preparation of a thermoplastic resin having excellent heat resistance, impact resistance and processability.

Recently, thermoplastic resins are used in various fields. Among these resins, the ones used as parts of electrical instruments and automobiles are required to have excellent heat resistance, impact resistance and processability.

As thermoplastic resins suitable for such purposes, various proposals have been made. But, their properties are not satisfactory. For instance, Japanese Patent Publication No. 37415/1971 provides a blend of a terpolymer of α-methylstyrene, methyl methacrylate and acrylonitrile with a graft polymer prepared by grafting methyl methacrylate and styrene or methyl methacrylate, styrene and acrylonitrile on a diene rubber. Since the terpolymer has excellent heat resistance but is remarkably inferior in impact resistance and the graft polymer has excellent impact strength but is much inferior in heat resistance, the properties of the resulting blend are naturally medium. Thus, a thermoplastic resin excellent both in heat resistance and in impact resistance is hardly obtainable.

For the purpose of providing a thermoplastic resin having high heat resistance and impact resistance, attempts have been made to graft an α-alkylstyrene, methyl methacrylate and an unsaturated nitrile onto a diene rubber. As a result, it has been found that the graft polymerization of the polymerizable monomers in the presence of a diene rubber latex comprising particles of large particle size is markedly slow in reaction rate so that it takes more than 3 days until the completion of the reaction and yields a resinous product markedly inferior in impact strength; while the polymerization in the presence of a diene rubber latex comprising particles of small particle size is remarkably high in reaction rate and yields a resinous product excellent in heat resistance, impact resistance and processability. In comparison with the large particle size rubber, the small particle size rubber is advantageous in requiring a very short time for the polymerization, therefore providing a resin at relatively low cost. The present invention is based on the above finding.

According to this invention, there is provided a process for preparing a thermoplastic resin which comprises emulsion polymerization, in the presence of a radical initiator, of a mixture comprising a monomeric mixture consisting essentially of an α-alkylstyrene of the formula:

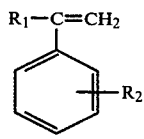

(wherein $R_1$ is $C_1$-$C_3$ alkyl and $R_2$ is hydrogen, $C_1$-$C_3$ alkyl or halo($C_1$-$C_3$)alkyl), methyl methacrylate and an unsaturated nitrile and a diene rubber latex containing at least 30% by weight of particles of 400 to 900 Å in particle size, the weight proportion of the monomeric mixture and the diene rubber latex (solids) being from 60:40 to 95:5.

Examples of the α-alkylstyrene are α-methylstyrene, α-ethylstyrene, methyl-α-methylstyrene, etc. Among them, α-methylstyrene is the most preferred. Examples of the unsaturated nitrile are acrylonitrile, methacrylonitrile, ethacrylonitrile, etc. Preferred is acrylonitrile. As the diene rubber latex, there are exemplified butadiene homopolymer, butadiene-styrene copolymer, acrylonitrile-butadiene copolymer, etc. Among them, butadiene homopolymer and butadiene-styrene copolymer having a styrene content of not more than 40% by weight are preferable. As the radical initiator, there may be used potassium persulfate, sodium persulfate, ammonium persulfate, cumene hydroperoxide, diisopropylbenzene hydroperoxide, etc. Among them, a water soluble one such as potassium persulfate or sodium persulfate is favorable.

As the emulsifier for the emulsion polymerization, any one as conventionally employed may be used. The use of an anionic emulsifier, particularly sodium laurylsulfate is favored.

The most characteristic feature in the present invention resides in the use of a diene rubber latex containing particles of 400 to 900 Å in particle size. The content of such small particles in the diene rubber latex is usually not less than 30% by weight, preferably not less than 60% by weight. When the content is less than 30% by weight, the rate of polymerization is slow, and the grafting polymerization does not sufficiently proceed so that the produced resin does not have a sufficient impact strength.

The diene rubber latex should be used in an amount of 5 to 40 parts by weight to 100 parts by weight of the combined amount of the monomeric mixture and the diene rubber latex (solids). In the case of the amount of the diene rubber latex being lower than the lower limit, the produced resin does not have a sufficient impact strength. In the case of the amount being larger than the upper limit, the resulting resin is inferior in hardness and tensile strength.

As to the proportion of each monomer component in the monomeric mixture, there is no particular limitation. However, the following composition is usually preferred: the α-alkylstyrene, 35 to 70% by weight; methyl methacrylate, 10 to 60% by weight; the unsaturated nitrile, 3 to 30% by weight. When the amount of the α-methylstyrene is smaller, the heat resistance of the resulting resin is lowered; when the amount is larger, the rate of polymerization becomes slower. When the amount(s) of methyl methacrylate and/or the unsaturated nitrile are smaller, the rate of polymerization becomes slower; when the amounts are larger, the heat resistance of the produced resin is lowered.

Each of the monomer components may be introduced into the reaction system in an optional order. Alternatively, they may be introduced as their mixture.

The grafting polymerization, i.e. emulsion polymerization may be carried out batchwise or continuously by a per se conventional procedure. If necessary, a polymerization regulator such as a chain transfer agent may be incorporated into the reaction system.

Separation of the produced resin from the reaction mixture may be carried out by a per se conventional procedure. For instance, the reaction mixture is admixed with a coagulant such as aluminum sulfate, and the coagulated solid is collected, kneaded by the aid of a Banbury mixer or a roll and then molded into an appropriate shape. In the course of these operations, a stabilizer, a plasticizer, a pigment, etc. may be incorporated therein.

Practical and presently preferred embodiments of this invention are illustratively shown in the following Examples wherein part(s) and percent are by weight.

EXAMPLES 1-8 AND COMPARATIVE EXAMPLES 1-2

Into a reactor flushed with nitrogen, a diene rubber latex and potassium persulfate were charged in the amounts as shown in Table 1. The inner temperature of the reactor was elevated to 70° C., and a monomeric mixture comprising t-dodecylmercaptan and an aqueous solution of sodium laurylsulfate were continuously introduced therein in 5 hours while stirring. After the introduction was completed, stirring was continued at 70° C. for additional 3 hours. (In Example 6, introduction was effected in the order of α-methylstyrene, methyl methacrylate and acrylonitrile (t-dodecylmercaptan)). The produced latex was coagulated with an aqueous solution of aluminum sulfate, collected by filtration, washed with water and then dried. The thus obtained powder was kneaded by the aid of a Banbury mixer at 180° C. and shaped into a test piece.

Using the test piece, examination on its physical properties was effected. The results are shown in Table 2.

weight of the monomer mixture of an α-alkylstyrene of the formula:

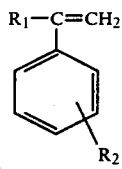

wherein $R_1$ is $C_1$-$C_3$ alkyl and $R_2$ is hydrogen, $C_1$-$C_3$ alkyl or halo $C_1$-$C_3$ alkyl, 10 to 60% by weight of the monomer mixture of methyl methacrylate, and 3 to 30% by weight of the monomer mixture of an unsaturated nitrile and a diene rubber latex containing particles at least 30% of which have a particle size of 400 to 900 Å, the weight proportion of the monomeric mixture and the diene rubber latex (solids) being from 60:40 to 95:5.

2. The process according to claim 1, wherein the emulsion polymerization is effected by the use of an anionic emulsifier.

3. The process according to claim 1, wherein the α-alkylstyrene is α-methylstyrene.

4. The process according to claim 1, wherein the

TABLE 1

| Materials | Example 1 | 2 | 3 | 4 | 5 | 6 | 7 | 8 | Comparative Example 1 | 2 |
|---|---|---|---|---|---|---|---|---|---|---|
| Polybutadiene, small particle size (part)*[1] | 8 | 35 | 20 | 20 | 20 | 20 | 13 | 8 | 3 | 4 |
| Polybutadiene, large particle size (part)*[2] | — | — | — | — | — | — | 7 | 12 | — | 16 |
| Monomeric mixture (part) | 92 | 65 | 80 | 80 | 80 | 80 | 80 | 80 | 97 | 80 |
| α-Methylstyrene (%) | 65 | 72 | 65 | 40 | 50 | 65 | 65 | 65 | 65 | 65 |
| Methyl methacrylate (%) | 20 | 10 | 20 | 50 | 30 | 32 | 20 | 20 | 20 | 20 |
| Acrylonitrile (%) | 15 | 18 | 15 | 10 | 20 | 3 | 15 | 15 | 15 | 15 |
| t-Dodecylmercaptan (part) | 0.1 | 0.1 | 0.1 | 0.1 | 0.1 | 0.1 | 0.1 | 0.1 | 0.1 | 0.1 |
| Potassium persulfate (part) | 0.5 | 0.5 | 0.5 | 0.5 | 0.5 | 0.5 | 0.5 | 0.5 | 0.5 | 0.5 |
| Sodium laurylsulfate (part) | 2.0 | 2.0 | 2.0 | 2.0 | 2.0 | 2.0 | 2.0 | 2.0 | 2.0 | 2.0 |
| Deionized water (total) (part) | 200 | 200 | 200 | 200 | 200 | 200 | 200 | 200 | 200 | 200 |
| Yield in polymerization (%) | 95 | 91 | 96 | 96 | 98 | 86 | 92 | 87 | 93 | 64 |

Note:
*[1]Content of particles of 400 to 900 Å in particle size, more than 99%.
*[2]Weight average particle size, 3000 Å; content of particles of 400 to 900 Å in particle size, less than 1%. (The particle size was determined by treating the rubber latex with osmium tetroxide and measuring the size of the resulting particles with an electron microscope.)

TABLE 2

| Item | Example 1 | 2 | 3 | 4 | 5 | 6 | 7 | 8 | Comparative Example 1 | 2 |
|---|---|---|---|---|---|---|---|---|---|---|
| Notched Izod impact strength ¼", 20° C. (kg.cm/cm$^2$) | 9.9 | 27.3 | 17.5 | 13.0 | 15.4 | 18.1 | 15.0 | 11.5 | 2.0 | 2.3 |
| Heat distortion temperature ASTM D-648-56 (°C.) | 132 | 131 | 130 | 123 | 125 | 133 | 126 | 124 | 134 | 119 |
| Flow rate Koka-type flow tester 230° C., 60 kg/cm$^2$ (ml/min) | 0.28 | 0.10 | 0.18 | 0.20 | 0.21 | 0.26 | 0.20 | 0.24 | 0.31 | 0.20 |

What is claimed is:

1. A process for preparing a thermoplastic resin which comprises emulsion polymerization, in the presence of a radical initiator, of a mixture comprising a monomer mixture consisting essentiall of 35 to 70% by unsaturated nitrile is acrylonitrile.

5. The process according to claim 1, wherein the diene rubber is butadiene homopolymer or butadiene-styrene copolymer having a styrene content of not more than 40% by weight.

6. The process according to claim 1, wherein the radical initiator is potassium persulfate or sodium persulfate.

* * * * *

UNITED STATES PATENT AND TRADEMARK OFFICE
CERTIFICATE OF CORRECTION

PATENT NO. : 4,273,895
DATED : June 16, 1981
INVENTOR(S) : Hiroyuki MINEMATSU, et al.

It is certified that error appears in the above-identified patent and that said Letters Patent are hereby corrected as shown below:

Column 3, line 70, "essentiall" should read --essentially--.

Signed and Sealed this

First Day of September 1981

[SEAL]

Attest:

GERALD J. MOSSINGHOFF

Attesting Officer     Commissioner of Patents and Trademarks